United States Patent [19]

Hastem-Müller

[11] Patent Number: 4,589,543

[45] Date of Patent: May 20, 1986

[54] DRIVE SHAFT FOR SLAT CONVEYOR

[76] Inventor: Hugo S. Hastem-Müller, Oettinger Strasse 9, 8860 Nördlingen, Fed. Rep. of Germany

[21] Appl. No.: 658,188

[22] Filed: Oct. 5, 1984

[30] Foreign Application Priority Data

Oct. 7, 1983 [DE] Fed. Rep. of Germany ....... 3336969

[51] Int. Cl.$^4$ ............................................. B65G 23/06
[52] U.S. Cl. .................... 198/834; 198/699; 198/843; 74/446; 474/153; 29/455 R
[58] Field of Search ............... 198/698, 699, 834, 842, 198/843; 74/443, 446, 447, 449; 474/152, 153, 161, 94; 29/455, 469.5, 526 R

[56] References Cited

U.S. PATENT DOCUMENTS

| | | | |
|---|---|---|---|
| 530,314 | 12/1894 | Williams | 29/526 R |
| 700,987 | 5/1902 | Sourek | 198/699 |
| 1,393,886 | 10/1921 | Doty | 74/443 |
| 2,324,181 | 7/1943 | Tulien | 29/455 |
| 2,923,166 | 2/1960 | Brindley et al. | 74/447 |
| 3,216,267 | 11/1965 | Dolza | 474/94 |
| 3,304,795 | 2/1967 | Rouverol | 74/446 |
| 3,968,561 | 7/1976 | Oakes et al. | 29/526 R |
| 4,181,217 | 1/1980 | Huls et al. | 198/842 |

FOREIGN PATENT DOCUMENTS 2323601  10/1983  Fed. Rep. of Germany .

Primary Examiner—Robert J. Spar
Assistant Examiner—Jonathan D. Holmes
Attorney, Agent, or Firm—Manfred M. Warren; Robert B. Chickering; Glen R. Grunewald

[57] ABSTRACT

A slat conveyor having a drive shaft with grooves running axially to the shaft and driving a plurality of endless conveyor belts connected to each other on the cargo carrying side with slats positioned transverse to the direction of travel and having on the other side of said belt teeth running parallel to the slats and shaped and positioned to engage in the grooves.

4 Claims, 5 Drawing Figures

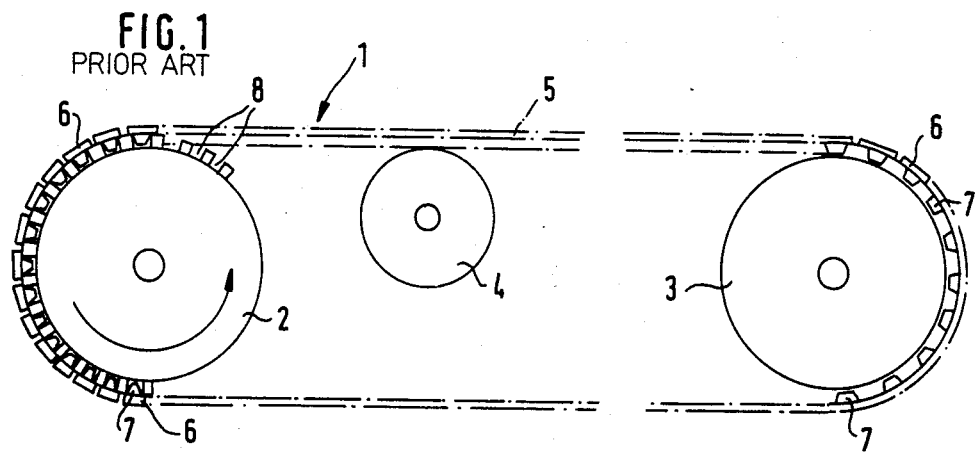
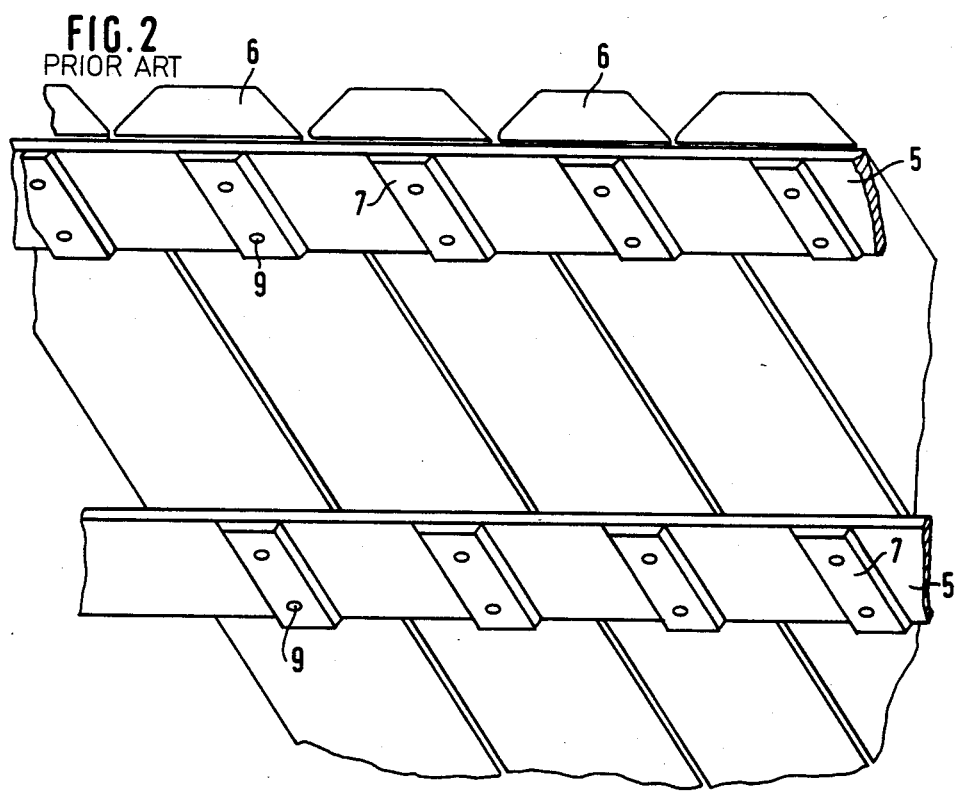

DRIVE SHAFT FOR SLAT CONVEYOR

The invention covers a drive shaft for a slat conveyor containing a slat conveyor belt running over the drive shaft and at least one additional shaft, in which the slats carrying the cargo are fastened to endless belts mounted at certain intervals side-by-side in the direction of conveyance. On their underside, teeth are provided set transversal to the direction of conveyance to engage corresponding grooves in at least the driving shaft.

Similar slat conveyors are used widely in the textile industry for the manufacture of fibre fleece to transport the fibres, but are also used in practically all other fields of conveyor technology, e.g. in the postal service for transport of packages or in industrial machinery and installations.

The belts used as carriers for the slats are made of leather or plastic and are a few cm wide. There are several of them—depending upon the width of the conveyor—but at least two belts, mounted at a certain distance from each other side-by-side, on which the slats are fastened.

According to the length of the conveyor belt, the latter runs over two or more shafts of which at least one is motor-driven.

Slat conveyors are known in which the transmission is achieved by static friction of the belts on the smooth surface of the drive shaft.

We often find slat conveyors—especially in the textile industry—in which the conveyor belt is unusually wide in comparison to its length. Widths of 10 to 15 m are not unusual.

These wide slat conveyor belts always tend to run askew during operation when driven by a smooth drive shaft. Due to this, shearing and bending stress develops at the slats and often damages them. Such slanted run then results in individual slats detaching themselves from the belts or, if the fastening of the slats on the belts holds tight, in individual slats breaking. In both cases, the damage enforces down-time of the conveyor and eventually of other machinery which is connected with the latter or depends upon said conveyor for its operations.

From the DE-OS 2 323 601 we know that teeth can be applied to the underside of the belts carrying the slats which engage into corresponding grooves in at least the driven shaft, so that the driving takes place in the manner of a gear belt, thus eliminating all problems of skew run.

A similar slat conveyor belt equipped on the underside of the belts with teeth requires a corresponding structure of the drive shaft which must be equipped at least in the area of said belts with grooves fitting said teeth. This involves considerable expense in making the drive shaft, not only for a conveyor originally equipped with toothed belts, but also for conversions from a conveyor with a smooth drive shaft to a similar tooth-equipped slat conveyor. Said expense is all the greater the wider the slat conveyor is built. Thus, for instance, it has been common practice during conversions to replace the tubular drive shaft with a thinner shaft on which rollers of fabric-based laminated material equipped with grooves are mounted in the area of the belts. Taking into account that, e.g. in a slat conveyor about 20 m wide, approximately 60 rollers must be provided on the drive shaft, the global expenses for the conversion add up to a sizeable amount.

The present invention is based upon the task of creating a drive shaft for a slat conveyor of the above kind which can be economically built not only as original equipment of a new conveyor but also as a converted shaft in a conveyor being converted from a slat conveyor without teeth to one with a tooth-equipped belt.

The problem is solved according to this invention by arranging the grooves in steel plate rings mounted on the drive shaft at least in the area of the carrier belts which are stamped meander-wise in correspondence to the division of the teeth, and by arranging between the projections adjacent to the grooves in said steel plate rings and the preferibly smooth surface of the shaft molded shapes of an elastomer supported pre-loaded on the surface of the shaft.

Said molded shapes are preferibly self-adhesive at least on the side towards the steel plate ring. This way, molded shapes can be attached to the steel plate ring before the latter is mounted on the shaft.

Strip steel is used as material for the steel plate ring from which, after the stamping operation, sections can be detached of a length required to form said ring.

In order to mount the steel plate ring on the smooth surface of the drive shaft, the stamped strip steel sections are, after insertion of the molded shapes, loosely layed around the shaft so that two projections approximately meet each other, and subsequently, the strip steel section is cut at the edges of said projections facing each other, whereupon the ends of said projections are bent inwards by 180°, approximately in the middle. Subsequently, the ends of the steel strip sections are forced towards each other until the two far sides of the projections meet under compression of the molded shapes and together form again the length of one projection, whereupon a clip wrapping itself around the bent ends is inserted in an axial direction of the steel plate ring.

This way the drive shaft can be made very economically and even a conversion from a drive shaft with a smooth surface is possible without having to replace the shaft itself.

Another advantage of said invention consists of the fact that by using the elastomer molded shapes, steel plate rings of the same diameter can be mounted on shafts in which the external diameter slightly deviates from the nominal.

We shall explain the invention based upon the drawings hereafter. In said drawings:

FIG. 1 schematically shows the guided run of a prior art slat conveyor over several shafts;

FIG. 2 shows a prior art slat conveyor belt seen at a slant from below;

Figure 3:
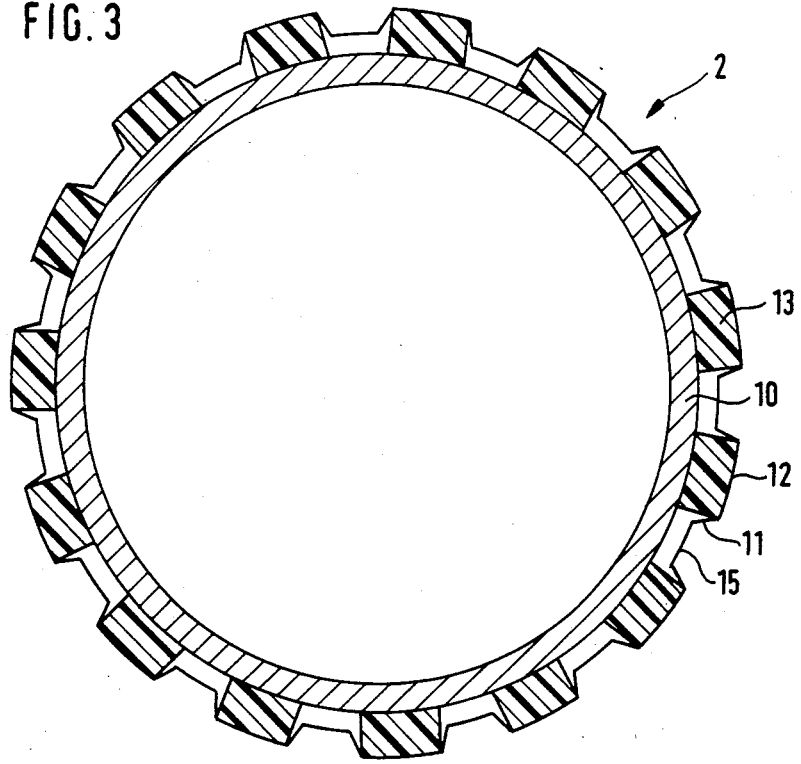
FIG. 3 shows a cross section of the drive shaft according to this invention, and FIGS. 4*a* and *b* show the ends of the steel plate ring to illustrate their locking.

FIG. 1 shows a slat conveyor consisting of a slat conveyor belt 1, two end shafts 2 and 3 of which the shaft marked 2 is motor-driven in the direction of the arrow, and another supporting shaft 4 between the two end shafts. The slat conveyor 1 consists of a number of carrier belts mounted side-by-side at a certain distance, of which one, marked 5, is shown. Slats 6 are fastened to the top of said carrier belts and teeth 7 to their underside. Said teeth have a flat cross section and are smaller than slats 6 under which they are centered. In the area of belts 5, the driven end shaft 2 is equipped with grooves 8 the shape and sequence of which corresponds to the teeth, so that the two engage. This forcibly drives the slat conveyor over its width and guides it so that it cannot run askew. End shaft 3 and support shaft 4 could be rotating or stationary, so that teeth 7 would slide over the surface of said shafts. This is easily achieved by making said teeth of a material such as polyamide which has excellent sliding properties.

FIG. 2 shows the structure of a slat conveyor. It shows two carrier belts 5 bearing teeth 7 on the underside at equal spacing which can be fastened eg. by rivets 9. On the other side, said rivets can have a traditional shape to allow slats 6 to be pressed on.

According to FIG. 3, the drive shaft 2 consists of a steel ring 10 with a smooth surface, surrounded by a steel plate ring 11 stamped meander-wise in correspondence to the division of teeth 7. Between projections 12 of the steel plate ring 11 and the tubular shaft 10, molded shapes 13 of an elastomer are arranged which keep the steel ring 11 spaced from the surface of the tubular shaft 10, simultaneously centering said steel plate ring on shaft 10. The steel plate ring 1 adheres under tension to molded shapes 13, so that the latter are compressed and so much friction ensues between them and the surface of the tubular steel shaft 10 that the steel plate ring 11 does not slip under the driving forces to be transmitted unto the slat conveyor. The friction can be enhanced by roughening or riffling the surface of the tubular steel shaft 10 and by selecting the proper material for the molded shapes 13. If desired, the steel plate ring 11 could also be screwed to the tubular shaft 10 at several points. The molded shapes 13 can be glued unto shaft 10. Preferably, several beads—not shown here—are provided in grooves 15 of the steel plate ring 11, spaced apart, running in a peripheral direction and pointing inwards. This considerably increases the stability of the steel plate ring.

Practical experience has shown that a wall thickness of about 0.6 mm is sufficient for the steel plate ring, so that it is easily machined.

The mounting of the steel plate ring 11 is shown in FIG. 4. The steel plate ring 11 is made from strip steel in a progressive die operation where upon the strip can be wound up, after stamping, on a storage reel. A section is detached from such a roll to fit around shaft 10 after first mounting the molded shapes 13. Said molded shapes 13 are preferably self-adhesive on the side towards the steel plate ring, so that they can be mounted without trouble. If they are later to be glued to shaft 10 also, the side of the molded shapes 13 towards said shaft 10 can also be self-adhesive.

Figure 4A:
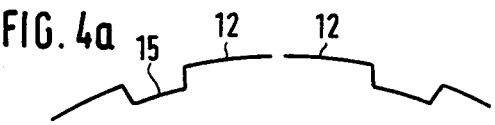
Figure 4B:

Subsequently, the strip steel section is loosely layed around shaft 10 so that two projections 12 are approximately adjacent, whereupon a cut is made at the ends of said projections facing each other. This state is shown in FIG. 4a. According to FIG. 4b, the free ends of projections 12 are now bent inward by about 180°, approximately in the middle, so that the remaining parts of both projections in a peripheral direction have again the length of one projection. After bending the free ends of projections 12 there is, of course, a gap between the latter. With a suitable device, the ends of said bent projections are forced towards each other, thus somewhat compressing molded shapes 13 giving them their preloading, and subsequently a clip 14 wrapping itself around the bent ends of said projections is inserted in an axial direction of steel plate ring 11, so that the latter is locked.

The drive shaft according to this invention can also be used as original equipment of a slat conveyor and it is then possible to use a single steel plate ring 11 running over the entire length of shaft 10. However, for wide slat conveyors with correspondingly many carrier belts 7 it is adviseable to provide several steel plate rings at the point of said carrier belts so that the width of the steel plate rings corresponds approximately to the width of said carrier belts.

It is, however, possible to convert an existing slat conveyor in the simplest way for use as tooth-equipped conveyor. This can be done on site without dismantling the existing drive shaft and the user can even make the conversion himself, since he only needs to buy the stamped steel plate sections which can be supplied to fit the diameter of the drive shaft of his equipment and with the ends already bent. The diameter of the shaft is only slightly increased by this conversion and this can be compensated, if required, by changing the drive speed.

I claim:

1. A drive shaft for a slat conveyor having a slat conveyor belt running over the drive shaft and at least one additional shaft, in which the slats on which the cargo is carried are fastened to endless carrier belts spaced apart side-by-side in the direction of conveyance, said carrier belts being equipped on their underside with teeth set transversely to the direction of conveyance and engaging corresponding grooves in at least the drive shaft, comprising the grooves (15) are made in steel plate rings (11) mounted on said drive shaft (2) at least in the area of the carrier belts (5) which steel plate rings are stamped meander-wise corresponding to the division and shape of said teeth (7), and that between the projections (12) defined by adjacent grooves (15) of said steel plate rings (11) and the preferably smooth surface of said shaft (2) molded shapes (13) of an elastomer are mounted, supported pre-loaded on the surface of said shaft (2).

2. Drive shaft according to claim 1, distinguished by the fact that the molded shapes (12) are self-adhesive at least on the side towards the steel plate ring (11).

3. Drive shaft according to claim 2, distinguished by the fact that the original material for the steel plate ring (11) is strip steel from which, after stamping, sections can be detached of the length required to form said ring.

4. A method for mounting steel plate rings on the drive shaft of a slat conveyor, said steel plate rings having meander-wise stampings defining transverse grooves and projections corresponding to the division and shape of teeth provided on the underside of a respective slat conveyor belt, comprising inserting elastomer molded shapes into the projections of said steel plate rings, laying said steel plate rings loosely around the smooth surface of said shaft so that the resultant projections at the cut ends of said steel plate ring are adjacent each other, bending the ends of said projections inwardly by 180°, forcing the bent ends together to compress said molded shapes, inserting a clip in a direction axially to said shaft and over said bent ends to hold said bent ends closely adjacent to one another.

* * * * *